(12) United States Patent
Balasubramanian et al.

(10) Patent No.: US 8,533,671 B2
(45) Date of Patent: Sep. 10, 2013

(54) ASSIGNING TYPE PARAMETERS

(75) Inventors: Ramrajprabu Balasubramanian, Renton, WA (US); Pravin R. Indurkar, Sammamish, WA (US); Yun Jin, Issaquah, WA (US); Balasubramanian Shyamsundar, Redmond, WA (US); Catherine E. Dumas, Bothell, WA (US); Au Ying Hung, Shanghai (CN); Matthew R. Winkler, Redmond, WA (US); Chao Tian, Shanghai (CN)

(73) Assignee: Microsoft Corporation, Redmond, WA (US)

( * ) Notice: Subject to any disclaimer, the term of this patent is extended or adjusted under 35 U.S.C. 154(b) by 540 days.

(21) Appl. No.: 12/795,049

(22) Filed: Jun. 7, 2010

(65) Prior Publication Data

US 2011/0302555 A1 Dec. 8, 2011

(51) Int. Cl.
*G06F 9/44* (2006.01)
(52) U.S. Cl.
USPC ........... 717/113; 717/106; 717/108; 717/109; 717/110; 717/116
(58) Field of Classification Search
None
See application file for complete search history.

(56) References Cited

U.S. PATENT DOCUMENTS

| | | | |
|---|---|---|---|
| 5,790,863 A * | 8/1998 | Simonyi | 717/113 |
| 6,014,518 A | 1/2000 | Steensgaard | |
| 6,269,475 B1 * | 7/2001 | Farrell et al. | 717/113 |
| 7,080,353 B2 | 7/2006 | Rosenberg | |
| 7,533,138 B1 * | 5/2009 | Martin | 1/1 |
| 7,631,295 B2 * | 12/2009 | Makowski et al. | 717/113 |
| 7,657,874 B2 * | 2/2010 | Lidin et al. | 717/126 |
| 2005/0149536 A1 * | 7/2005 | Wildes et al. | 707/100 |
| 2006/0048024 A1 * | 3/2006 | Lidin et al. | 714/724 |
| 2006/0236315 A1 | 10/2006 | Bracha | |
| 2007/0006138 A1 * | 1/2007 | Ahe et al. | 717/106 |
| 2008/0109785 A1 * | 5/2008 | Bailey | 717/109 |
| 2008/0262992 A1 | 10/2008 | Meijer | |
| 2009/0070740 A1 * | 3/2009 | Onodera et al. | 717/116 |
| 2010/0023925 A1 * | 1/2010 | Shribman et al. | 717/110 |
| 2010/0050101 A1 * | 2/2010 | Baik et al. | 715/764 |
| 2010/0269096 A1 * | 10/2010 | Araya et al. | 717/113 |
| 2011/0023014 A1 * | 1/2011 | Harper et al. | 717/108 |

OTHER PUBLICATIONS

Chen, L., et al., Applying Generalization Refactoring to Java Generic Programs, IEEE International Workshop on Semantic Computing and Systems, 2008, pp. 35-39, [retrieved on May 11, 2013], Retrieved from the Internet: <URL:http://ieeexplore.ieee.org/>.*

Donovan, A., et al., Converting Java Programs to Use Generic Libraries, Proceedings of the 19th annual ACM SIGPLAN conference on Object-oriented programming, systems, languages, and applications, 2004, pp. 15-34, [retrieved on May 11, 2013], Retrieved from the Internet: <URL:http://dl.acm.org/>.*

(Continued)

*Primary Examiner* — Thuy Dao
*Assistant Examiner* — Geoffrey St Leger
(74) *Attorney, Agent, or Firm* — Workman Nydegger

(57) ABSTRACT

The present invention extends to methods, systems, and computer program products for assigning type parameters. Embodiments of the invention permit using a visual editor to edit arbitrary object instances in a graphical fashion. Instances of generic types can be manipulated to change the type parameters for that generic (to be able to change a List<Customer> to a List<Product>, for instance). Values are preserved and data can be patched to other dependent nodes in an object hierarchy.

20 Claims, 4 Drawing Sheets

(56) References Cited

OTHER PUBLICATIONS

MSDN, C# Programming Guide, Generic Type Parameters (C# Programming Guide), Based on information and belief available, at least as early as Jan. 21, 2010, 2 pages.

Lowy, Juval, MSDN, Visual Stuido 2005 Technical Articles, "An Introduction to C# Generics", Jan. 2005, 25 pages.

Spring Framework, "Chapter 5. The IoC container", Based on information and belief available, at least as early as Jan. 21, 2010, 34 pages.

.NET Code, "Declarative Generics and Type Converters/Generics/C#", Based on information and belief available, at least as early as Jan. 21, 2010, 5 pages.

\* cited by examiner

ASSIGNING TYPE PARAMETERS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Various different types of editors can be used when developing software applications. In some computing environments, visual editors are used (either singly or in combination with textual editors). Visual editors operate on the composition of a graph of object instances. The object instances can correspond to a graphical element, such as, for example, a button or slider control. For visual editors of non-user interface ("UI") domains, object instances can correspond to workflow elements, database tables, or business level objects, such as, for example, customers and orders. Visual editors allow for a use to select the type of object that is to be added to a canvas.

Generic types can be used during software application development. Generic types are types which can be parameterized by any additional number of type parameters. These type parameters are used to customize the fields, methods, and method parameters of an instance of the generic type. Thus, generic types provide many powerful capabilities when building applications and components. However, when an object instance of a generic type is created, its type parameters are typically fixed for the lifetime of the object. As such, when a generic type is included in an object hierarchy, the generic type can limit the effective set of edits that are allowed.

Further, visual editors typically lack the flexibility to operate on generic types. For example, visuals editors are unable to arbitrarily replace a given node in an object graph which is of a different type (e.g., to go from Foo<string> to Foo<int>). Visual editors are also typically unable to surface any mechanism to choose an object type when an object is added and unable to surface any mechanism to change the type parameters of an object.

Even if a visual editor could perform one or more these operations, the visual editor may lack any ability to compensate for changes to downstream dependent objects within an object hierarchy. For example, a class Orders<T> may define a List<T>, which requires a change in T for Orders to also impact changing the list. Further difficulties can arise in handling data that is connected to the choice of T. For example, given a List<Int> what can be done if Int is changed to string. These difficulties can be compounded when lossy conversions are to occur. For example, reversing the previous example, given a List<string> what can be done if string is changed to Int and one or more alphabetic characters are included in a string.

BRIEF SUMMARY

The present invention extends to methods, systems, and computer program products for assigning type parameters. An object node is accessed from an instantiated object hierarchy. The object node represents an object of a generic type that was assigned to a first specified type by applying generic parameters defining the first specified type. The object node has one or more properties indicating the location of the object node within the instantiated object hierarchy.

A visual editor is used to replace an object node with a new object node assigned to a different second specified type. Replacement of the object node includes using user-interface controls of the visual editor to create a new object of a generic type. Creation of the new object also includes selecting generic type parameters for defining an object of the second specified type. Creation of the new object further includes applying the selected generic type parameters to the new object to assign the new object to be of the second specified type.

The configuration of the object node is preserved within the new object node. Configuration preservation includes copying the non-parameterized data from the object node to the new object node. Configuration preservation also includes using an available type converter to convert at least one portion parameterized data from the first specified type to the second specified type. Configuration preservation further includes storing the parameterized data in the second specified type in the new object node.

The one or more properties are then used to replace the object node with the new object node within the instantiated object hierarchy. When appropriate, back pointers can be used to obtain a list of other objects that refer back to the object. The object graph can be patched to include the information from the new object node.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
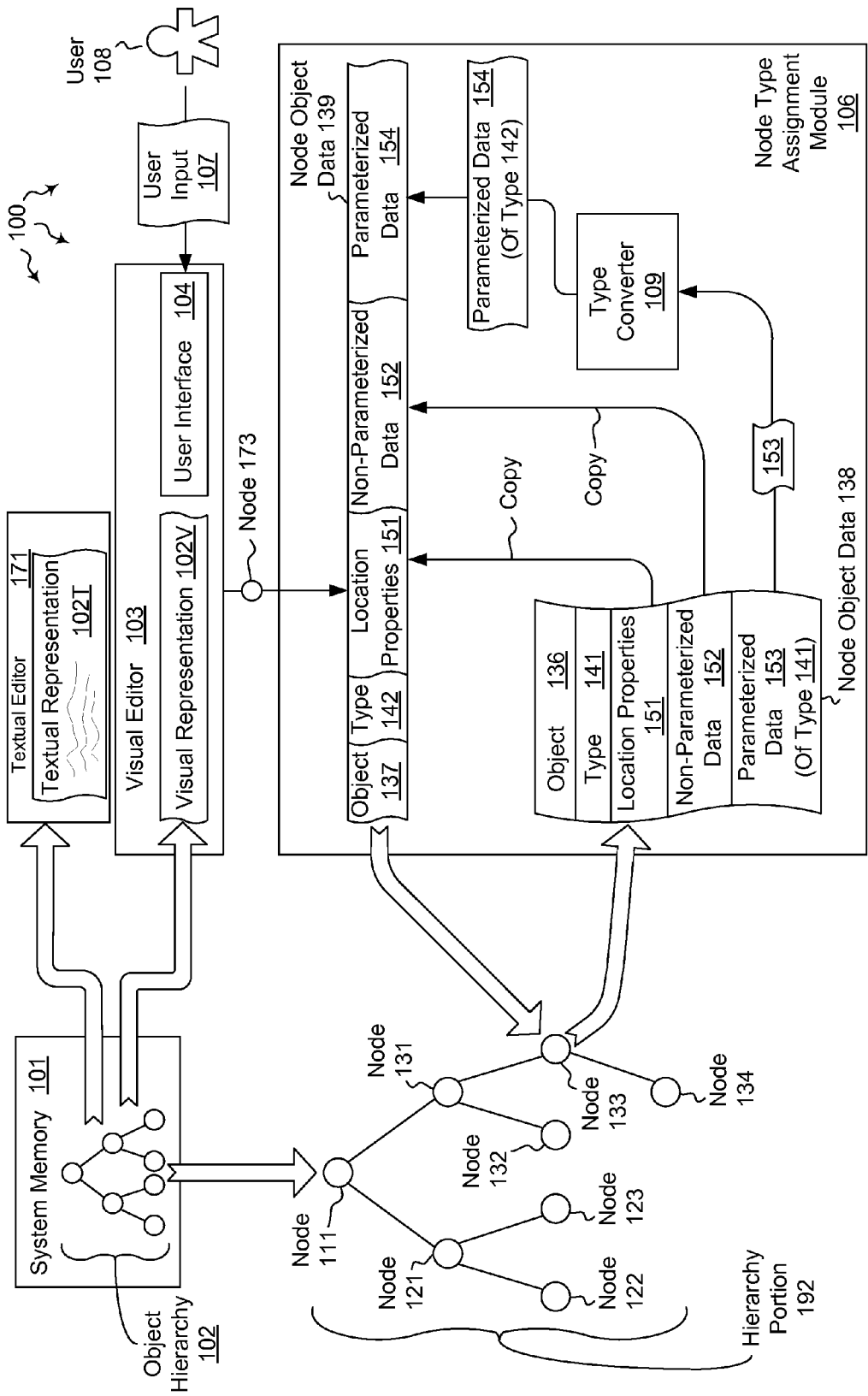
FIG. 1A illustrates an example computer architecture that facilitates assigning type parameters.

The present invention extends to methods, systems, and computer program products for assigning type parameters. An object node is accessed from an instantiated object hierarchy. The object node represents an object of a generic type that was assigned to a first specified type by applying generic parameters defining the first specified type. The object node has one or more properties indicating the location of the object node within the instantiated object hierarchy.

A visual editor is used to replace an object node with a new object node assigned to a different second specified type. Replacement of the object node includes using user-interface controls of the visual editor to create a new object of a generic type. Creation of the new object also includes selecting generic type parameters for defining an object of the second specified type. Creation of the new object further includes applying the selected generic type parameters to the new object to assign the new object to be of the second specified type.

The configuration of the object node is preserved within the new object node. Configuration preservation includes copying the non-parameterized data from the object node to the new object node. Configuration preservation also includes using an available type converter to convert at least one portion parameterized data from the first specified type to the second specified type. Configuration preservation further includes storing the parameterized data in the second specified type in the new object node.

The one or more properties are then used to replace the object node with the new object node within the instantiated object hierarchy. When appropriate, back pointers can be used to obtain a list of other objects that refer back to the object. The object graph can be patched to include the information from the new object node.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1A illustrates an example computer architecture 100 that facilitates assigning generic types. Referring to FIG. 1, computer architecture 100 includes system memory 101, textual editor 171, visual editor 103, and node type assignment module 106. Each of the depicted components can be connected to one another over (or be part of) a system bus and/or a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, object hierarchy 102 is instantiated in system memory 101. Each node in object hierarchy 102 represents an object (e.g., a code object). Nodes lower in object hierarchy 102 can inherit properties from other nodes higher in object hierarchy 102. Hierarchy portion 192 represents a portion of object hierarchy 102. It may be that node 111 represents the root node of object hierarchy 102. Object hierarchy 102 can be a tree structure or some other form of directed graph.

Textual editor 171 can represent object hierarchy in textual representation 102T. Likewise, visual editor 103 can represent object hierarchy 102 in visual representation 102V. Visual editor 103 also includes user interface 104 that can be used to receive user input for creating and altering visual representation 102V (textual editor 171 can also include a user interface). In some embodiments, textual editor 171 and visual editor 103 interoperate and/or are integrated within another component, such as, for example, an Integrated Development Environment ("IDE") and present a common user interface.

Node type assignment module 106 is configured to assign types to object node data for nodes in object hierarchy 102. Type assignment can include initial assignment of object node data as well as altering existing object node data, for example, when changing the parameter of a generic type, or "re-typing". When re-typing, type converter 109 can be used to convert parameterized data between different types. Type converter 109 can be one of a number of type converters used by node type assignment module 106 to convert between different types of parameterized data. In some embodiments, node type assignment module 106 further includes an extensibility point for calling out to custom conversion behavior, such as, for example, when converting to and/or from a user defined type. As such, when node type assignment module 106 does not include a valid conversion between different types, customized conversion behavior can be called.

Figure 2:
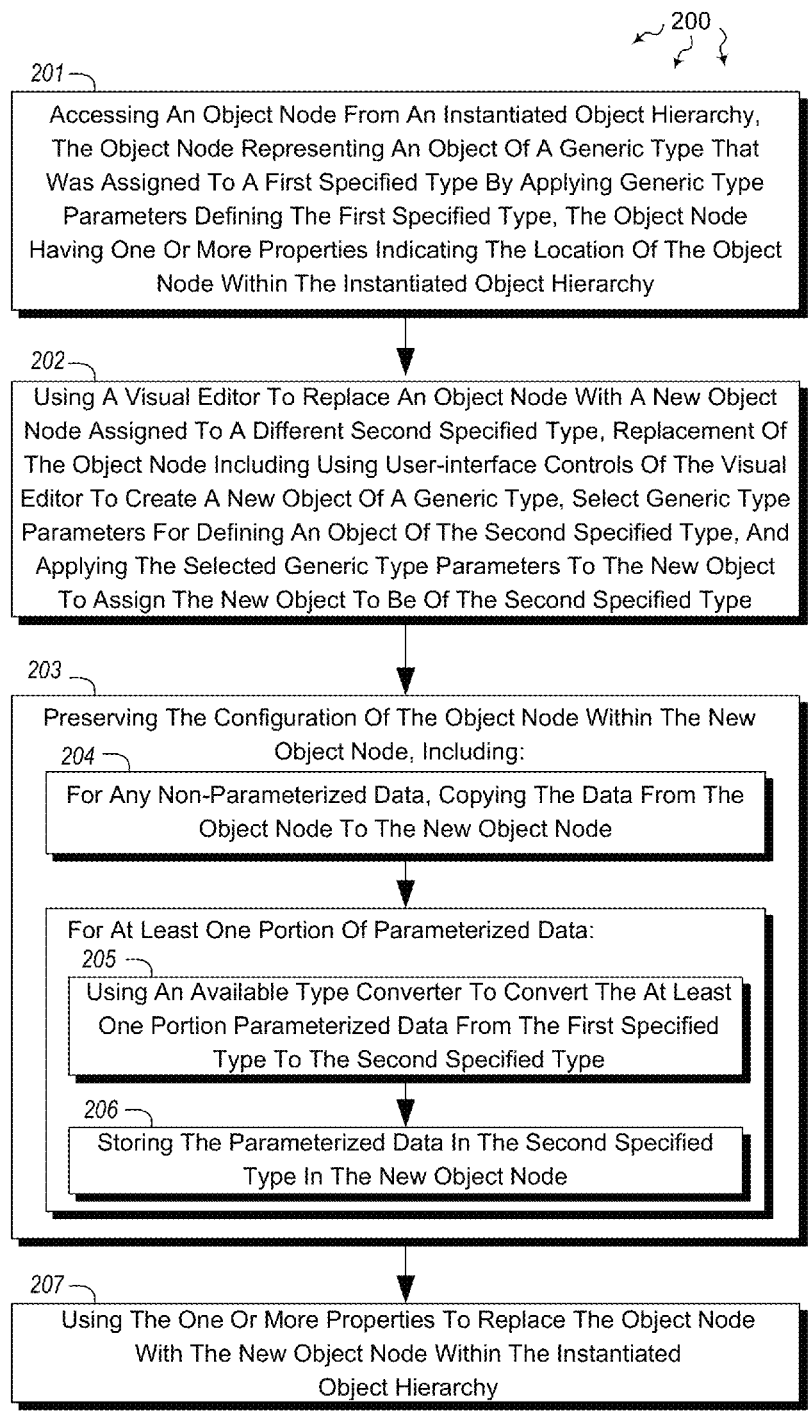
FIG. 2 illustrates a flow chart of an example method for assigning type parameters.

FIG. 2 illustrates a flow chart of an example method 200 for assigning generic types. Method 200 will be described with respect to the components and data of computer architecture 100.

Method 200 includes an act of accessing an object node from a instantiated object hierarchy, the object node representing an object of a generic type that was assigned to a first specified type by applying generic type parameters defining the first specified type, the object node having one or more properties indicating the location of the object node within the instantiated object hierarchy (act 201). For example, node type assignment module 106 can access node 133 from object hierarchy 102. Node type assignment module 106 can access properties of node 133, including node object data 138. As depicted in node object data 138, includes object 136, type 141, location properties 151, non-parameterized data 152, and parameterized data 153.

Node object data 138 represents object 136 of a generic type that was assigned type 141. Type 141 can be virtually any data type, such as, for example, Integer, Boolean, String, Floating Point, Pointer, List, Customer, Order, Product, etc. Various type parameters can be applied to node 133 to populate the contents of node object data 138. Location properties 151 indicate the location of node 133 within object hierarchy 102.

Method 200 includes an act of using the visual editor to replace an object node with a new object node assigned to a different second specified type, replacement of the object node including using user-interface controls of the visual editor to create a new object of a generic type, select generic type parameters for defining an object of the second specified type, and applying the selected generic type parameters to the new object to assign the new object to be of the second specified type (act 202). For example, user 108 can use visual editor 103 to create node 173 having node object data 139. User 108 can enter user input 107 through user interface 104 to create node 173. As depicted in node object data 139, includes object 137 and type 142. Node object data 139 represents object 137 of a generic type that was assigned type 142. Various type parameters can be applied to node 173 to populate the contents of node object data 139.

Figure 3:
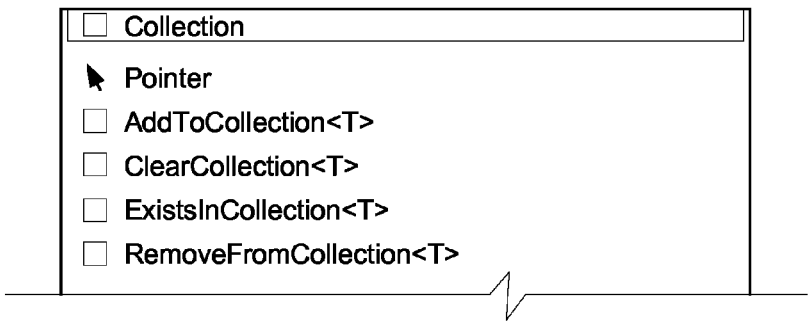
FIG. 3 illustrates a collection of generic types that can be added to an object hierarchy.
Figure 4:
FIG. 4 illustrates an activity presented with a default type.
Figure 5:
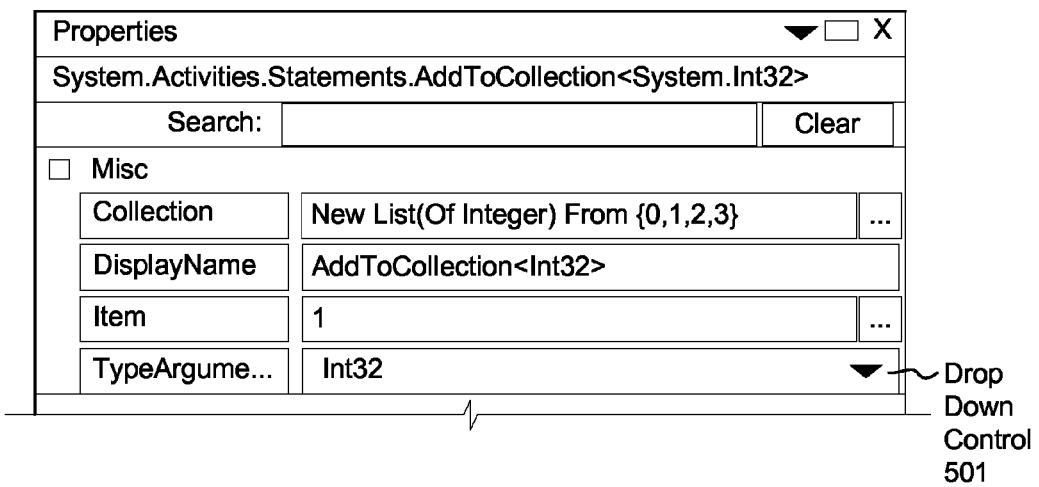
FIG. 5 illustrates a more detailed view of a type instance.

User 108 can use user interface controls of user interface 104 to select type parameters defining object 137 to be of type 142. User 108 can then apply the selected type parameters to define object 137 of type 142. FIG. 3 illustrates a collection of generic types that can be added to an object hierarchy. FIG. 4 illustrates an object presented with a default type. FIG. 5 illustrates a more detailed view of an object instance. As depicted in FIG. 5, drop down control 501 can be used to select different types, such as, for example, Integer, Boolean, String, Floating Point, List, Customer, Order, Product, etc. One or more of the user interface controls depicted in FIGS. 3-5 as well as other similar user interface controls can be used to assign type 142 to object 137.

Method 200 includes an act of preserving the configuration of the object node within the new object node (act 203). For example, the configuration of node 133 can be preserved in node 173. Act 203 includes for any non-parameterized data, an act copying the data from the object node to the new object node (act 204). For example, non-parameterized data 152 can be copied from node object data 138 to node object data 139. Similarly, location properties 151 can be copied from node object data 138 to node object data 139.

Act 203 includes for at least one portion of parameterized data, an act of using an available type converter to convert the at least one portion parameterized data from the first specified type to the second specified type (act 205). For example, type converter 109 can be used to convert parameterized data 153 (e.g., List<Customer>) to parameterized data 154 (e.g., List<Product>). Act 203 includes for at least one portion of parameterized data, storing the parameterized data in the second specified type in the new object node (act 206). For example, parameterized data 154 can be stored in node object data 139.

Method 200 includes an act of using the one or more properties to replace the object node with the new object node within the instantiated object hierarchy (act 207). For example, node type assignment module 106 can use location properties 151 to insert node object data 139 at node 133. When object hierarchy 102 is changed, textual editor 171 and visual editor 103 can update textual representation 102T and visual representation 102V respectively to reflect the change. Thus, node 133 can be updated to reflect type 142 after node object data 139 is replaced in object hierarchy 102.

After node object data is changed, it may be that one or more other nodes, on which the changed node depends, are also to be changed to maintain data integrity. For example, inserting node object data 139 at node 133 can impact node object data at nodes 131 and 111. In some embodiments, a list of back pointers is maintained. The list of back pointers can be used to patch data at other nodes above a changed node within an object hierarchy.

Figure 1B:
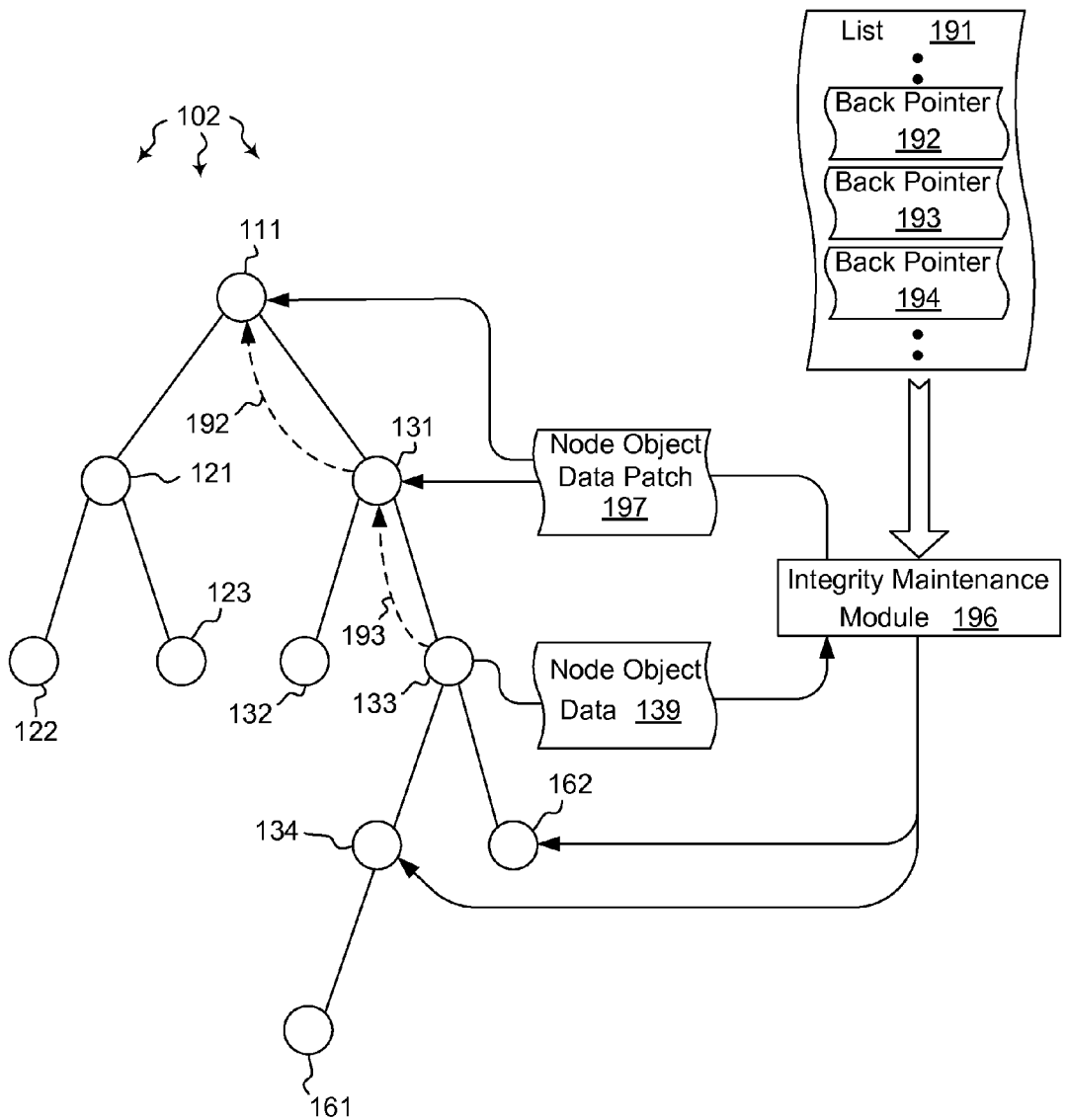
FIG. 1B illustrates a portion of the computer architecture of FIG. 1A that facilitates maintaining the integrity of dependent data in an object hierarchy.

FIG. 1B illustrates a portion of the computer architecture of FIG. 100 that facilitates maintaining the integrity of dependent data in an object hierarchy. As depicted, list 191 contains back pointers 192, 193, 194, etc. Back pointer 193 provides a link from node 133 to node 131. Similarly, back pointer 192 provides a link from node 131 to node 111. Thus, when data is changed at node 133, the corresponding back pointers can be used to maintain the integrity of data at nodes 131 and 111.

For example, integrity maintenance module 196 can access node object data 139 and list 191. Using back pointers 193 and 192, integrity maintenance module 196 can patch a list of objects, for example, objects represented at nodes 131 and 111, referring back to node 133. Integrity maintenance module 196 can formulate node object patch data 197 to update node object data at nodes 131 and 111 (potentially through interoperation with node type assignment module 106). Integrity maintenance module 196 can then apply node object data patch at nodes 131 and 111. Integrity maintenance module 196 can also use front pointers inherent in object hierarchy 102 to patch data to nodes 134, 161, etc.

Thus, given an arbitrary type, such as, for example, MyObject<T>, embodiments of the invention allow for a user to select the correct types from a displayed dialog box. The editor can be as simple as a list of types, or can include sophisticated behavior to respect known type constraints. Once an instance is rendered on visual editor 103, one retains the ability to change the type. For example, the same dialog box used for initial selection can be used to manipulate the type (and on change we replace the object within the object graph).

As described, once the type T is changed for MyObject<T>, the change is propagated to other properties and items that depend on type T. Thus can occur, for example, when the MyObject<TNew> is created (this has the side effect of instantiating the object correctly throughout the entire object hierarchy).

Accordingly, embodiments of the invention permit using a visual editor to edit arbitrary object instances in a graphical fashion. Instances of generic types can be manipulated to change the type parameters for that generic (to be able to change a List<Customer> to a List<Product>, for instance). Values are preserved and data can be patched to other dependent nodes in an object hierarchy, The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, the computer system also including an object hierarchy instantiated in the system memory, the object hierarchy corresponding to a textual representation of program code and for use in generating a visual representation of the program code, the computer system also including a visual editor for editing the visual representation of the program code generated from the object hierarchy, the object hierarchy including a plurality of levels of connected object nodes, the plurality of levels of connected object nodes including at least a root object node level and a leaf object node level, each of the plurality of levels of connected object nodes including one or more object nodes, each of the one or more object nodes at each leaf object node level including a connection to at least another object node at a level above the object node, at least one of the object nodes in the object hierarchy representing an object of a generic type, the at least one object nodes having been assigned specified types by applying generic type parameters to the at least one object nodes at the time the at least one object nodes were instantiated, a method for replacing an object node with another object node assigned to a different specified type using the visual editor, the method comprising:

an act of accessing an object node from the object hierarchy, the object node representing an object of a generic type that was assigned to a first specified type by applying generic type parameters defining the first specified type, the object node having one or more location properties indicating the location of the object node within the object hierarchy;

an act of using the visual editor to replace the object node with a new object node assigned to a different second specified type, replacement of the object node including using user-interface controls of the visual editor to create a new object of a generic type, select generic type parameters for defining an object of the second specified type, and apply the selected generic type parameters to the new object to assign the new object to be of the second specified type;

an act of preserving the configuration of the object node within the new object node, including:
  for any non-parameterized data, copying the non-parameterized data from the object node to the new object node;
  copying the location properties to the new object node; and
  for at least one portion of parameterized data:
    an act of using a type converter to convert the at least one portion of parameterized data from the first specified type to the second specified type; and
    an act of storing the parameterized data in the second specified type in the new object node; and an act of using the one or more location properties to replace the object node with the new object node within the object hierarchy such that each parent node and child node relationship of the object node are preserved in the object hierarchy for the new object node.

2. The method as recited in claim 1, further comprising:
an act of referring to a list of back pointers to identify other nodes dependent on the data in the new object node; and
an act of patching data at the identified other nodes to maintain the data integrity of the object hierarchy.

3. The method as recited in claim 1, wherein the object hierarchy is a directed graph.

4. The method as recited in claim 1, further comprising an act of updating one or more of the textual representation and the visual representation to reflect insertion of the new object node into the object hierarchy.

5. The method as recited in claim 1, wherein the act of using a type converter to convert the at least one portion of parameterized data from the first specified type to the second specified type comprises an act of using a type converter having a known valid conversion for converting the parameterized data from the first specified type to the second specified type.

6. The method as recited in claim 1, wherein the act of using a type converter to convert the at least one portion of parameterized data from the first specified type to the second specified type comprises an act of referring to an extensibility point having customized conversion behavior.

7. The method as recited in claim 1, wherein the first specified type is any valid type selected from among: integer, floating point, Boolean, string, pointer, list, product, and customer.

8. A computer program product for use at a computer system, the computer system including an object hierarchy instantiated in the system memory, the object hierarchy corresponding to a textual representation of program code and for use in generating a visual representation of the program code, the computer system also including a visual editor for editing the visual representation of the program code generated from the object hierarchy, the object hierarchy including a plurality of levels of connected object nodes, the plurality of levels of connected object nodes including at least a root object node level and a leaf object node level, each of the plurality of levels of connected object nodes including one or more object nodes, each of the one or more object nodes at each leaf object node level including a connection to at least another object node at a level above the object node, at least one of the object nodes in the object hierarchy representing an object of a generic type, the at least one object nodes having been assigned specified types by applying generic type parameters to the at least one object nodes at the time the at least one object nodes were instantiated, the computer program product for implementing a method for replacing an object node with another object node assigned to a different specified type using the visual editor, the computer program product comprising one or more computer-readable storage memories having stored thereon computer-executable instructions that, when executed at a processor, cause the computer system to perform the method, including the following:
  access an object node from the object hierarchy, the object node representing an object of a generic type that was assigned to a first specified type by applying generic type parameters defining the first specified type, the object node having one or more location properties indicating the location of the object node within the object hierarchy;
  use the visual editor to replace the object node with a new object node assigned to a different second specified type, replacement of the object node including using user-interface controls of the visual editor to create a new object of a generic type, select generic type parameters for defining an object of the second specified type, and apply the selected generic type parameters to the new object to assign the new object to be of the second specified type;
  preserve the configuration of the object node within the new object node, including:
    for any non-parameterized data, copying the non-parameterized data from the object node to the new object node;
    copying the location properties to the new object node; and
    for at least one portion of parameterized data:
      using a type converter to convert the at least one portion parameterized data from the first specified type to the second specified type; and
      storing the parameterized data in the second specified type in the new object node; and
  use the one or more location properties to replace the object node with the new object node within the object hierarchy such that each parent node and child node relationship of the object node are preserved in the object hierarchy for the new object node.

9. The computer program product as recited in claim 8, further comprising computer-executable instructions that, when executed, cause the computer system to:
  refer to a list of back pointers to identify other nodes dependent on the data in the new object node; and
  patch data at the identified other nodes to maintain the data integrity of the object hierarchy.

10. The computer program product as recited in claim 8, wherein the object hierarchy is a directed graph.

11. The computer program product as recited in claim 8, further comprising computer-executable instructions that, when executed, cause the computer system to update one or more of the textual representation and the visual representation to reflect replacement of the new object node into the object hierarchy.

12. The computer program product as recited in claim 8, wherein computer-executable instructions that, when executed, cause the computer system to use a type converter to convert the at least one portion of parameterized data from the first specified type to the second specified type comprise computer-executable instructions that, when executed, cause the computer system to use a type converter having a known valid conversion for converting the parameterized data from the first specified type to the second specified type.

13. The computer program product as recited in claim 8, wherein computer-executable instructions that, when executed, cause the computer system to use a type converter to convert the at least one portion of parameterized data from the first specified type to the second specified type comprise computer-executable instructions that, when executed, cause the computer system to refer to an extensibility point having customized conversion behavior.

14. The computer program method as recited in claim 8, wherein the first specified type is any valid type selected from among: integer, floating point, Boolean, string, pointer, list, product, and customer.

15. A computer system, the computer system comprising:
  one or more processors;
  system memory, an object hierarchy being instantiated within the system memory;
  one or more computer storage media having stored thereon computer-executable instructions representing a textual editor, a visual editor, a node type assignment module, and an integrity maintenance module, wherein the textual editor is configured to:
    present a textual representation of the object hierarchy;
  wherein the visual editor is configured to:
    present a visual representation of the object hierarchy; and
    create a new object node of a new type for replacement into the object hierarchy, replacement of the object including using user-interface controls of the visual editor to (a) create a new object of a generic type, (b) select generic type parameters for defining an object of the new type, and (c) apply the selected generic type parameters to the new object to assign the new object to be of the new type;
  wherein the node type assignment module is configured to:
    access an object node from the object hierarchy, the object node representing an object of a generic type that was assigned to a current type by applying generic type parameters defining the current type, the object node having one or more location properties indicating the location of the object node within the object hierarchy;

preserve the configuration of the object node within the new object node, including:

for any non-parameterized data, copying the non-parameterized data from the object node to the new object node;

copying the location properties to the new object node; and for at least one portion of parameterized data:

using a type converter to convert the at least one portion parameterized data from the current type to the new type; and storing the parameterized data in the new type in the new object node; and use the one or more location properties to replace the object node with the new object node within the object hierarchy such that each parent node and child node relationship of the object node are preserved in the object hierarchy for the new object node; and wherein the integrity maintenance module is configured to refer to a list of back pointers to identify other nodes dependent on the data in the new object node; and patch data at the identified other nodes to maintain the data integrity of the object hierarchy.

16. The computer system as recited in claim 15, wherein the object hierarchy is a directed graph.

17. The computer system as recited in claim 15, wherein the textual editor is further configured to update the textual representation to reflect insertion of the new object node into the object hierarchy and the visual editor is further configured to update the visual representation to reflect replacement of the new object node into the object hierarchy.

18. The computer system as recited in claim 15, wherein the node type assignment module being configured to use a type converter to convert the at least one portion of parameterized data from the first specified type to the second specified type comprises the node type assignment module being configured to use a type converter having a known valid conversion for converting the parameterized data from the current type to the new type.

19. The computer system as recited in claim 15, wherein the node type assignment module being configured to use a type converter to convert the at least one portion of parameterized data from the first specified type to the second specified type comprises the node type assignment module being configured to refer to an extensibility point having customized conversion behavior.

20. The computer system as recited in claim 15, wherein the new type is selected from among: integer, floating point, Boolean, string, pointer, list, product, and customer.

* * * * *